United States Patent
He et al.

(10) Patent No.: US 7,080,179 B1
(45) Date of Patent: Jul. 18, 2006

(54) MULTI-LEVEL INTERRUPTS

(75) Inventors: Changbai He, San Jose, CA (US); Ron Talmor, Cupertino, CA (US)

(73) Assignee: Foundry Networks, Inc., Santa Clara, CA (US)

( * ) Notice: Subject to any disclaimer, the term of this patent is extended or adjusted under 35 U.S.C. 154(b) by 233 days.

(21) Appl. No.: 10/810,057

(22) Filed: Mar. 26, 2004

(51) Int. Cl.
    *G06G 13/32* (2006.01)
(52) U.S. Cl. .................................... 710/269
(58) Field of Classification Search ............... 710/269
    See application file for complete search history.

(56) References Cited

U.S. PATENT DOCUMENTS

| | | | | |
|---|---|---|---|---|
| 5,828,891 A * | 10/1998 | Benayoun et al. | .......... | 710/269 |
| 6,108,744 A * | 8/2000 | Lebee | .......... | 710/266 |
| 6,681,281 B1 * | 1/2004 | Maleck | .......... | 710/261 |
| 6,775,730 B1 * | 8/2004 | Marr et al. | .......... | 710/266 |
| 6,820,155 B1 * | 11/2004 | Ito | .......... | 710/262 |
| 6,968,411 B1 * | 11/2005 | Gaur et al. | .......... | 710/260 |

* cited by examiner

*Primary Examiner*—Rehana Perveen
*Assistant Examiner*—Christopher Daley
(74) *Attorney, Agent, or Firm*—Thelen Reid & Priest LLP; Marc S. Hanish

(57) ABSTRACT

Multiple levels of interrupts to be utilized in a computer system, which allows, for example, an interrupt with an interrupt level associated with an application to be distinct from an interrupt with an interrupt level associated with a kernel. The kernel level interrupt may be handled quickly via its own handler, while the application level interrupt may be handled more slowly. This may be accomplished by first determining if a first-level handler is installed for the interrupt source. If so, then it may be called. Otherwise, the interrupt source may be masked and a second-level handler may be called. Once this second-level handler has completed its tasks, the interrupt source may then be unmasked. Implementations with three or more levels of interrupt are also possible.

34 Claims, 3 Drawing Sheets

MULTI-LEVEL INTERRUPTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates to the field of interrupting processing in a computer system. More particularly, the present invention relates to a solution providing multiple levels of interrupts in a computer system.

BACKGROUND OF THE INVENTION

In a computer system, a hardware interrupt is a signal from a hardware device indicating a need to interrupt processing of a program. The purpose of an interrupt is to ensure that high-priority tasks are carried out promptly and not delayed by slower, less important tasks. For example, a real time device such as a hard drive might interrupt the execution of a spreadsheet program to deliver data.

Interrupts may be raised in hardware by sending a signal down a dedicated wire, or in software by executing a special instruction. In either case, the processor typically pushes its current register contents onto a stack to preserve them, and starts to execute a new program known as an interrupt handler. When that is complete, the processor may restore its registers from the stack and continue as before. One interrupt may interrupt another, and so on, to many levels.

In order to handle cases where one interrupt may interrupt another, priority levels are used to differentiate the importance of each interrupt. These priority levels are limited, however. No matter the priority level of an interrupt, it always interrupts the current processing. In certain applications, however, such as switches, it can be very important to preserve kernel processing, while application processing may be easily interrupted.

A need exists, therefore, for a solution that allows for interrupts to be executed by an application without affecting kernel processing.

BRIEF DESCRIPTION OF THE INVENTION

Multiple levels of interrupts to be utilized in a computer system, which allows, for example, an interrupt with an interrupt level associated with an application to be distinct from an interrupt with an interrupt level associated with a kernel. The kernel level interrupt may be handled quickly via its own handler, while the application level interrupt may be handled more slowly. This may be accomplished by first determining if a first-level handler is installed for the interrupt source. If so, then it may be called. Otherwise, the interrupt source may be masked and a second-level handler may be called. Once this second-level handler has completed its tasks, the interrupt source may then be unmasked. Implementations with three or more levels of interrupt are also possible.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a system of computers, servers, and software. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Furthermore, the present invention is described in the context of a switch. However, one of ordinary skill in the art will recognize that the term switch should be read broadly, so as to include any device that directs packets, including a router and a gateway.

The present invention allows multiple levels of interrupts to be utilized, which allows, for example, an interrupt with an interrupt level associated with an application (user-level interrupt) to be distinct from an interrupt with a level associated with a kernel (kernel-level interrupt). The kernel level interrupt may be handled quickly via its own handler, while a user-level interrupt may be handled more slowly. An application can only install user-level interrupt handlers, as a problem could occur if a domain installer wants the handler to access private domain space, since the domain of the handler may not be the same domain in which the task installs the handler.

Figure 1:
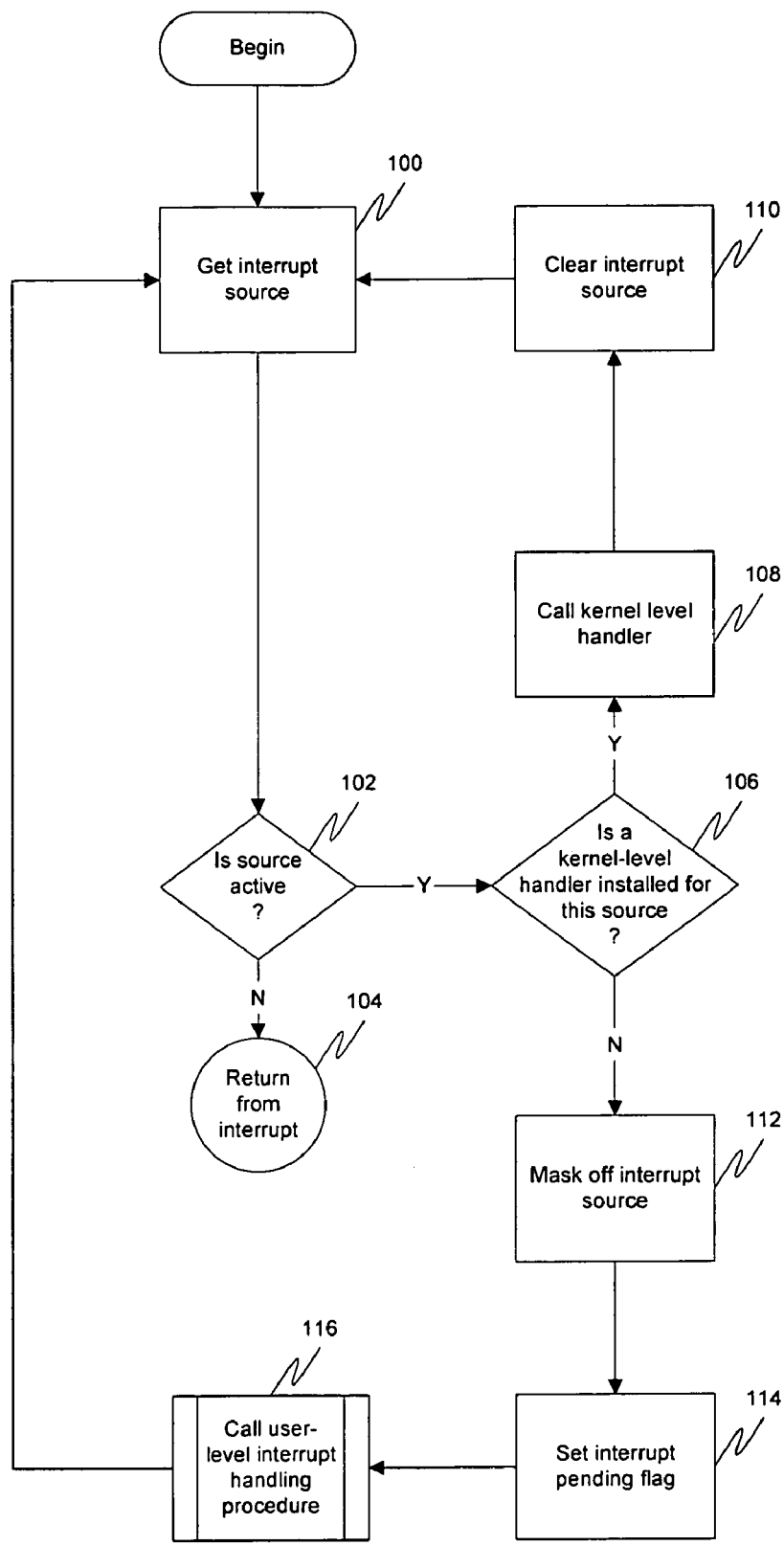
FIG. 1 is a flow diagram illustrating a method for handling an interrupt in accordance with an embodiment of the present invention.

FIG. 1 is a flow diagram illustrating a method for handling an interrupt in accordance with an embodiment of the present invention. This figure illustrates an embodiment having 2 levels of interrupts, described as kernel-level and user-level, however, one of ordinary skill in the art will recognize that embodiments can be created having any number of different levels. Each act in this process may be performed by hardware or software. In this embodiment of the present invention, no other interrupts are allowed while handling the current interrupt using this process, at least until the process is passed to a user-level interrupt handling procedure as will be described.

At 100, the source of the interrupt may be retrieved. The process then searches the active interrupt sources at 102 to determine whether or not they are active. If not, then at 104 the process may return from the interrupt. If the source is active, then at 106 it may be determined if a kernel-level handler is installed for this source. If so, then that indicates that the interrupt is a kernel-level interrupt, and thus at 108 the kernel level handler may be called. Then at 110, the interrupt source may be cleared and the process returned to 100, where it may await another interrupt.

Figure 2:
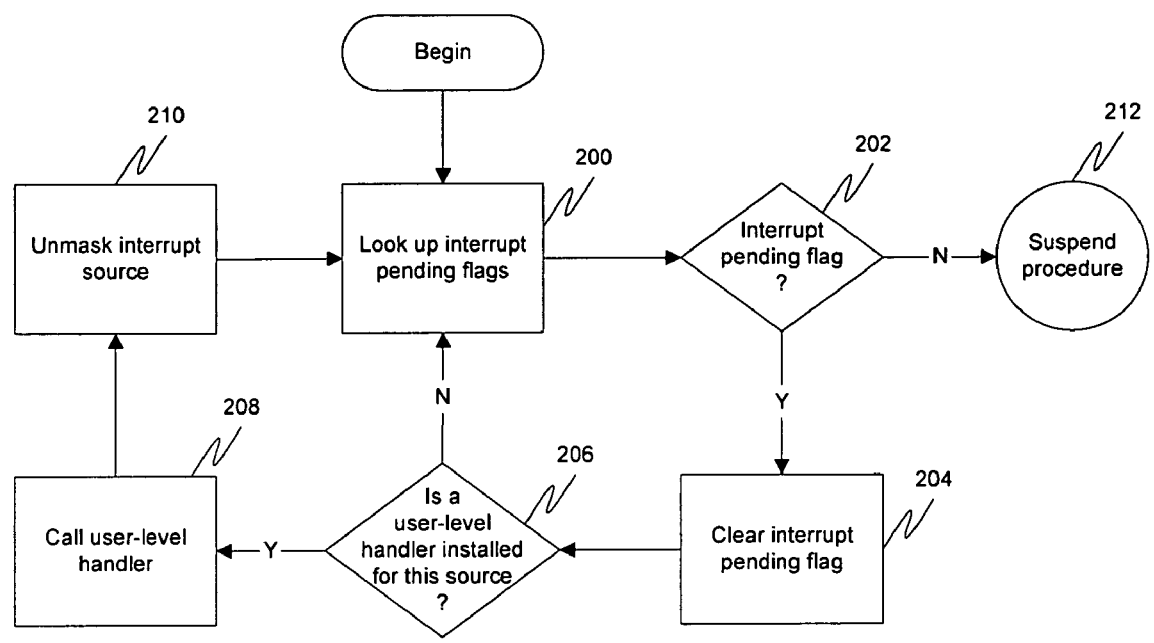
FIG. 2 is a flow diagram illustrating a user-level interrupt handling procedure in accordance with an embodiment of the present invention.

If at 106 it was determined that no kernel-level handler was installed for this source, then this may indicate that the interrupt is a user-level interrupt, and thus at 112 the interrupt source may be masked off. At 114, an interrupt pending flag may be set. Then at 116, a user level-interrupt handling procedure may be called. FIG. 2 is a flow diagram illustrating a user-level interrupt handling procedure in accordance with an embodiment of the present invention. Each act in this procedure may be performed by hardware or software. Since the user-level interrupt handling procedure is a real-time task, it can preempt time-sliced tasks, even tasks that are locked. This emulates the real interrupt behavior in other systems. Setting it as non-preemptive does not prevent the interrupt from happening.

At 200, interrupt pending flags may be searched. If at 202 it is determined that an interrupt pending flag exists, then at 204 the interrupt pending flag may be cleared. Then at 206, it may be determined if a user-level handler is installed for this source. If not, then the process may simply return to 200 to continue looking up pending interrupt flags. At this point the interrupt source may be left disabled to prevent the same interrupt source from coming in again. If a user-level handler exists for this source, however, then at 208 the user-level handler may be called. Then at 210, the interrupt source may be unmasked.

If at 202, it is determined that there are no more interrupt pending flags, then at 212 the user-level interrupt handling procedure may be suspended.

The interrupt routine may be executed in the same domain in which the task installs the interrupt handler. This allows the interrupt handler to access the private space of the installing task.

Figure 3:
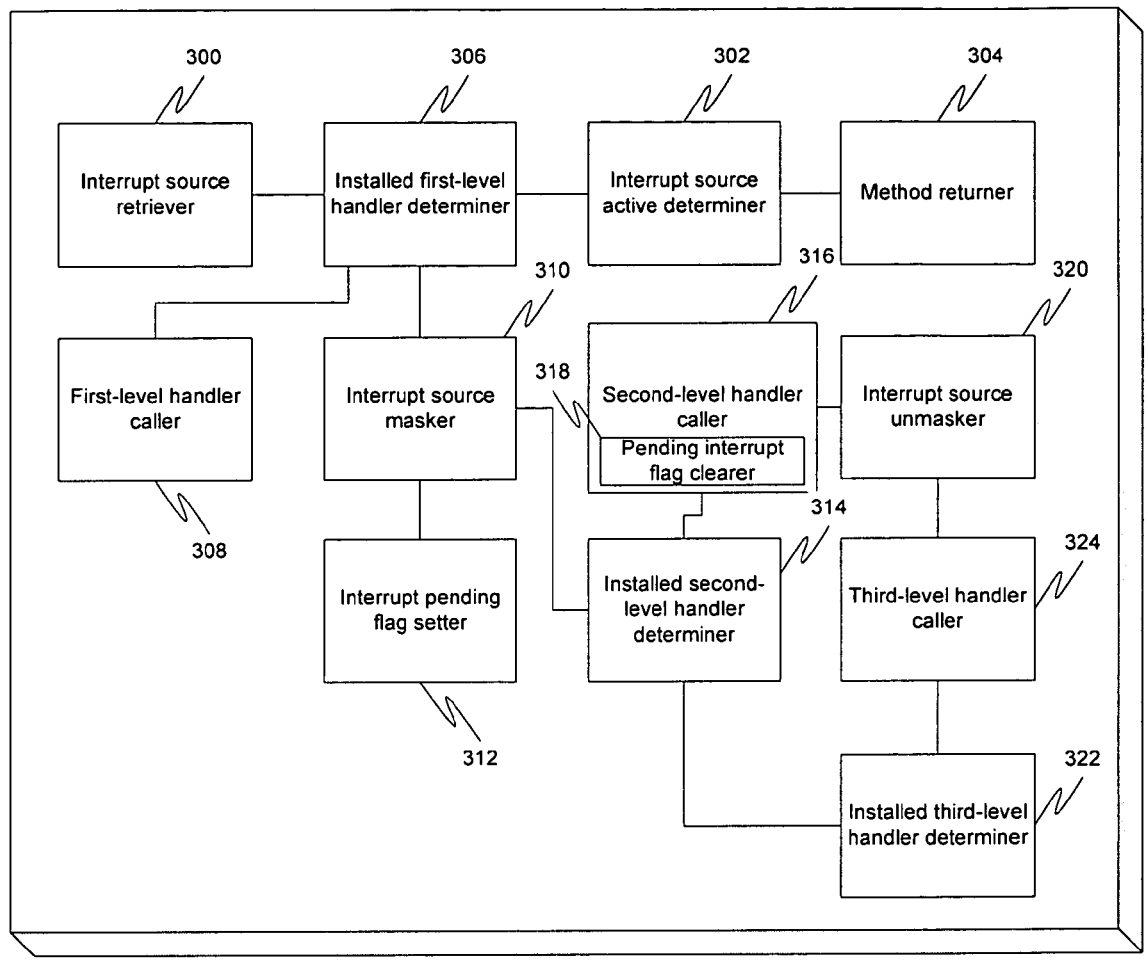
FIG. 3 is a block diagram illustrating an apparatus for handling an interrupt in accordance with an embodiment of the present invention.

FIG. 3 is a block diagram illustrating an apparatus for handling an interrupt in accordance with an embodiment of the present invention. This figure illustrates an embodiment having 2 levels of interrupts, described as kernel-level and user-level, however, one of ordinary skill in the art will recognize that embodiments can be created having any number of different levels. Each act performed by the apparatus may be performed by hardware or software. In this embodiment of the present invention, no other interrupts are allowed while handling the current interrupt using this process, at least until the process is passed to a user-level interrupt handling procedure as will be described.

An interrupt source retriever 300 may retrieve the source of the interrupt. An interrupt source active determiner 302 coupled to the interrupt source retriever 300 may then search the active interrupt sources to determine whether or not they are active. If not, then a method returner 304 coupled to the interrupt source active determiner 302 may return the process from the interrupt. If the source is active, then an installed first level handler determiner 306 coupled to the interrupt source retriever 300 may determine if a kernel-level handler is installed for this source. If so, then that indicates that the interrupt is a kernel-level interrupt, and thus a first-level handler caller 308 coupled to the installed first-level handler determiner 306 may call the kernel-level handler. Then the interrupt source may be cleared and the process may await another interrupt.

If it was determined that no kernel-level handler was installed for this source, then this may indicate that the interrupt is a user-level interrupt, and thus an interrupt source masker 310 coupled to the installed first-level handler determiner 306 may mask off the interrupt source. An interrupt pending flag setter 312 coupled to the interrupt source masker 310 may set the interrupt pending flag for the source. Then an installed second-level handler determiner 314 coupled to the interrupt source masker 312 may determine if a second-level handler for the interrupt source is installed. If not, then the process may simply continue looking up pending interrupt flags. At this point the interrupt source may be left disabled to prevent the same interrupt source from coming in again. If a user-level handler exists for this source, however, then a second-level handler caller 316 coupled to the installed second-level handler determiner 314 may call the user-level handler. The second-level handler caller 316 may include a pending interrupt flag clearer 318, which may clear the pending interrupt flag. Then an interrupt source unmasker 320 coupled to the second-level handler caller 316 may unmask the interrupt source.

If there is a third-level of interrupt, then an installed third-level handler determiner 322 coupled to the installed second-level handler determiner 314 may determine if a third-level handler is installed for the interrupt source. If so, then a third-level handler caller 324 coupled to the installed third-level handler determiner 322 and to the interrupt source unmasker 320 may call the third-level handler, and then the interrupt source unmasker 320 may unmask the interrupt source. This may be repeated for as many levels as needed.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for handling an interrupt in a computer system, the interrupt having a source, the method comprising:

determining if a first-level handler is installed for the interrupt source;

calling said first-level handler if one is installed for the interrupt source;

masking the interrupt source if a first-level handler is not installed for the interrupt source;

calling a second-level handler if a first-level handler is not installed for the interrupt source; and unmasking the interrupt source if a first-level handler is not installed for the interrupt source.

2. The method of claim 1, further comprising:
retrieving the interrupt source.

3. The method of claim 1, further comprising:
determining if the interrupt source is active; and
returning from the method if the interrupt source is not active.

4. The method of claim 1, further comprising:
setting an interrupt pending flag for the interrupt source before said calling a second-level handler if a first level-handler is not installed for the interrupt source.

5. The method of claim 4, wherein said calling a second-level handler includes:
clearing the pending interrupt flag for the interrupt source.

6. The method of claim 1, wherein said first-level handler is a kernel-level handler.

7. The method of claim 1, wherein said second-level handler is a user-level handler.

8. A method for handling an interrupt in a computer system, the interrupt having a source, the method comprising:
determining if a first-level handler is installed for the interrupt source;
calling said first-level handler if one is installed for the interrupt source;
masking the interrupt source if a first-level handler is not installed for the interrupt source;
determining if a second-level handler is installed for the interrupt source if a first-level handler is not installed for the interrupt source;
calling said second-level handler if a first-level handler is not installed for the interrupt source and a second-level handler is installed for the interrupt source; and
unmasking the interrupt source if a first-level handler is not installed for the interrupt source.

9. The method of claim 8, further comprising:
determining if a third-level handler is installed for the interrupt source if a first-level handler is not installed for the interrupt source and a second-level handler is not installed for the interrupt source; and
calling said third-level handler if a first-level handler is not installed for the interrupt source, a second-level handler is not installed for the interrupt source, and a third-level handler is installed for the interrupt source.

10. The method of claim 8, further comprising:
retrieving the interrupt source.

11. The method of claim 8, further comprising:
determining if the interrupt source is active; and
returning from the method if the interrupt source is not active.

12. The method of claim 8, further comprising:
setting an interrupt pending flag for the interrupt source before said calling said second-level handler.

13. The method of claim 12, wherein said calling a second-level handler includes:
clearing the pending interrupt flag for the interrupt source.

14. An apparatus for handling an interrupt in a computer system, the interrupt having a source, the apparatus comprising:
an installed first-level handler determiner;
a first-level handler caller coupled to said installed first-level handler determiner;
an interrupt source masker coupled to said installed-first level handler determiner;
an installed second-level handler determiner coupled to said interrupt source masker;
a second-level handler caller coupled to said installed second-level handler determiner; and
an interrupt source unmasker coupled to said second-level handler caller.

15. The apparatus of claim 14, further comprising:
an installed third-level handler determiner coupled to said installed second-level handler determiner; and
a third-level handler caller coupled to said installed third-level handler determiner and to said interrupt source unmasker.

16. The apparatus of claim 14, further comprising:
an interrupt source retriever coupled to said installed first-level handler determiner.

17. The apparatus of claim 14, further comprising:
an interrupt source active determiner coupled to said installed first-level handler determiner; and
a method returner coupled to said interrupt source active determiner.

18. The apparatus of claim 14, further comprising:
an interrupt pending flag setter coupled to said interrupt source masker.

19. The apparatus of claim 18, wherein said second-level handler caller includes a pending interrupt flag clearer.

20. An apparatus for handling an interrupt in a computer system, the interrupt having a source, the apparatus comprising:
means for determining if a first-level handler is installed for the interrupt source;
means for calling said first-level handler if one is installed for the interrupt source;
means for masking the interrupt source if a first-level handler is not installed for the interrupt source;
means for calling a second-level handler if a first-level handler is not installed for the interrupt source; and
means for unmasking the interrupt source if a first-level handler is not installed for the interrupt source.

21. The apparatus of claim 20, further comprising:
means for retrieving the interrupt source.

22. The apparatus of claim 20, further comprising:
means for determining if the interrupt source is active; and
means for returning from the method if the interrupt source is not active.

23. The apparatus of claim 20, further comprising:
means for setting an interrupt pending flag for the interrupt source before said calling a second-level handler if a first level-handler is not installed for the interrupt source.

24. The apparatus of claim 23, wherein said means for calling a second-level handler includes:
means for clearing the pending interrupt flag for the interrupt source.

25. The apparatus of claim 20, wherein said first-level handler is a kernel-level handler.

26. The apparatus of claim 20, wherein said second-level handler is a user-level handler.

27. An apparatus for handling an interrupt in a computer system, the interrupt having a source, the apparatus comprising:
means for determining if a first-level handler is installed for the interrupt source;
means for calling said first-level handler if one is installed for the interrupt source;

means for masking the interrupt source if a first-level handler is not installed for the interrupt source;

means for determining if a second-level handler is installed for the interrupt source if a first-level handler is not installed for the interrupt source;

means for calling said second-level handler if a first-level handler is not installed for the interrupt source and a second-level handler is installed for the interrupt source; and means for unmasking the interrupt source if a first-level handler is not installed for the interrupt source.

28. The apparatus of claim 27, further comprising:

means for determining if a third-level handler is installed for the interrupt source if a first-level handler is not installed for the interrupt source and a second-level handler is not installed for the interrupt source; and means for calling said third-level handler if a first-level handler is not installed for the interrupt source, a second-level handler is not installed for the interrupt source, and a third-level handler is installed for the interrupt source.

29. The apparatus of claim 27, further comprising:

means for retrieving the interrupt source.

30. The apparatus of claim 27, further comprising:

means for determining if the interrupt source is active; and means for returning from the method if the interrupt source is not active.

31. The apparatus of claim 27, further comprising:

means for setting an interrupt pending flag for the interrupt source before said calling said second-level handler.

32. The apparatus of claim 31, wherein said means for calling a second-level handler includes:

means for clearing the pending interrupt flag for the interrupt source.

33. A program storage device readable by a machine, tangibly embodying a program of instructions executable by the machine to perform a method for handling an interrupt in a computer system, the interrupt having a source, the method comprising:

determining if a first-level handler is installed for the interrupt source;

calling said first-level handler if one is installed for the interrupt source;

masking the interrupt source if a first-level handler is not installed for the interrupt source;

calling a second-level handler if a first-level handler is not installed for the interrupt source; and unmasking the interrupt source if a first-level handler is not installed for the interrupt source.

34. A program storage device readable by a machine, tangibly embodying a program of instructions executable by the machine to perform a method for handling an interrupt in a computer system, the interrupt having a source, the method comprising:

determining if a first-level handler is installed for the interrupt source;

calling said first-level handler if one is installed for the interrupt source;

masking the interrupt source if a first-level handler is not installed for the interrupt source;

determining if a second-level handler is installed for the interrupt source if a first-level handler is not installed for the interrupt source;

calling said second-level handler if a first-level handler is not installed for the interrupt source and a second-level handler is installed for the interrupt source; and unmasking the interrupt source if a first-level handler is not installed for the interrupt source.

* * * * *